C. J. PAINE.
Canning Fruit.
No. 68,384.
Patented Sept. 3, 1867.
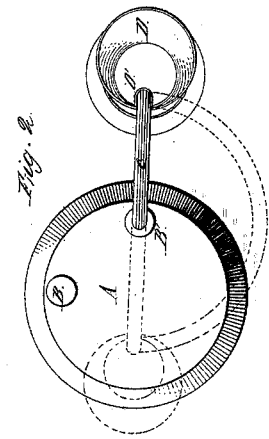
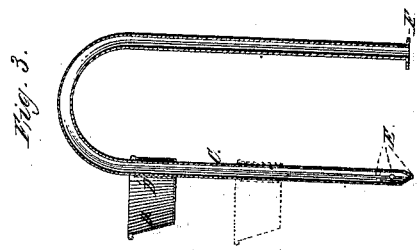
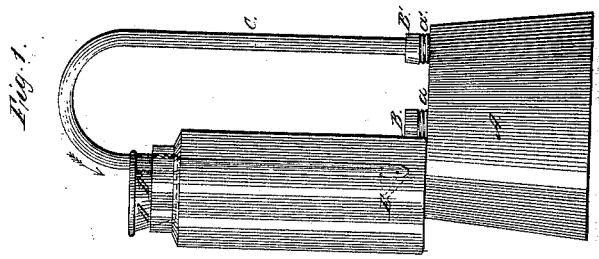
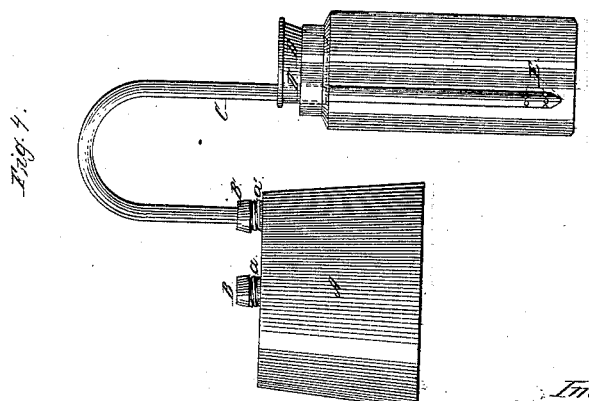
Witnesses:
Inventor:
Clinton J. Paine

CLINTON J. PAINE, OF YOUNG AMERICA, ILLINOIS.

Letters Patent No. 68,384, dated September 3, 1867.

IMPROVEMENT IN CANNING FRUITS.

*The Schedule referred to in these Letters Patent and making part of the same.*

TO ALL WHOM IT MAY CONCERN:

Be it known that I, CLINTON J. PAINE, of Young America, county of Warren, and State of Illinois, have invented a new Mode for Canning Fruits, &c., and apparatus for conducting the process; and I do hereby declare that the following is a full and exact description thereof, reference being had to the accompanying drawings, in which—

Figure 1 is an elevation of the whole apparatus, with a jar resting on the top of the boiler in position for the process.

Figure 2, plan or top view of the same, showing the pipe swung out to allow its being inserted into the jar.

Figure 3, a vertical section of the pipe and its perforated and flanged ends, with the adjustable filler attached thereto, showing its up-and-down movement, and Figure 4 an elevation of the apparatus as arranged for using the jar or can on the outside of the boiler.

The letters of reference indicate the same parts in all the figures.

In the common or domestic process for conducting the canning of fruit it is first heated in a separate vessel, generally in quantity sufficient for filling a number of cans, and the cans have to be heated before filling, those of glass being usually placed in a vessel of cold water and gradually brought to the boiling point. This mode of proceeding necessarily involves much time, and frequently leaves doubt as to the completeness of the sealing. Moreover, the stirring of the heating mass to equalize the heat destroys the form of the fruit, particularly the tender kinds, as strawberries, &c.

My improved process is intended to save the time unnecessarily consumed by such primary heating of the fruit in mass, and the warming of the cans or jars; also to insure, with more certainty, the necessary vacuum for the proper sealing of the contents of the can or jar, and to prevent the natural form of the fruit from being broken or disturbed. The following will enable others skilled in the art to understand and use my said new process, and to construct the apparatus which I employ therefor.

A, fig. 1, is a boiler, of tin or any suitable metal, closed on the top, and of capacity to hold say eight pints of water. On the top are two apertures in which are secured necks $a\ a'$, closed by screw-caps, B B'. C is a pipe connected to the neck $a'$ by the screw-cap B'; it is bent as shown in the figure, the bent part being sufficiently elevated to allow the jar to stand on the top of the boiler with the pipe within it. D is a tin filler or short funnel, employed for filling in the fruit in the jar; it is similar in shape to that already in use, excepting that it has one straight side on which is secured a collar, D', as seen in fig. 2, through which the pipe C is passed, so that it (the funnel) is free to slide up and down the pipe. The said pipe C is perforated with a sufficient number of holes, E, on the lower part of the end which goes into the jar. The other end has a flange, F, fig. 3, which is admitted inside the screw-cap B', a hole being provided in its top for the purpose; it is secured to the neck before mentioned by the screw-cap, as stated, a ring of packing being interposed to make it tight.

The operation is as follows: The boiler is partially filled with water, (or hot water may be poured in at once,) and then set on some convenient heater, or top of a stove, to boil. The pipe C, with the funnel D, is then turned round so that its perforated end will be on the outside of the boiler. A can or jar is then to be filled with the fruit in a cold state, and as soon as the steam is seen issuing, the pipe is run down through the body of the fruit until its end touches, or nearly touches, the bottom. As the pipe goes in the funnel slides up, and it (the pipe) is then turned back so as to allow the bottom of the jar to rest on the top of the boiler, as seen in fig. 1. If a glass jar be used the whole process will be at once seen and better understood. It will be noticed that as soon as the steam permeates through the body of the fruit, the juice and air will be expelled from it (the fruit) at once, and that the heating of the walls of the jar goes on simultaneously. The juice then fills the interstices between the fruit. As the body of the fruit shrinks more is put in, and repeated until the juice is seen at the neck of the jar and covering the top of the fruit. The jar is then to be removed from the boiler by turning out the pipe, and the cap put on at once. The whole process occupies about three minutes for cans of the ordinary size. The fruit and jar are thus so perfectly and systematically heated that no doubt can be reasonably entertained but that the necessary vacuum is complete.

This mode of canning, it will be seen, is especially adapted to the tender kinds of fruit, as they can with very little care be made to retain their natural form. For the convenience of filling the can or jar on the outside of and below the boiler, which by some might be deemed preferable, the pipe may have its perforated end extended below its bottom, as shown in fig. 4, in which case its bent portion need not be so elevated. The perforated holes E might, if so desired, be extended up the sides of the pipe, but I deem a few placed at the bottom is better adapted for and fully answers the purpose in view.

What I claim as my invention, and desire to secure by Letters Patent, is—

1. I claim the improved mode herein described for canning fruits, &c., by means of steam introduced into the body of the fruit, &c., whilst the same is in a cold state, substantially as set forth.

2. I claim the special use of the pipe C provided with perforations E, and operating in the manner and for the purpose substantially as specified.

3. The filler or funnel D, provided with the collar D', in combination with the pipe C, and operating so as to be adjusted to any height, can or jar, in the manner substantially as herein set forth.

4. The combination of the pipe C, filler D, provided with the collar D', and boiler A, arranged and operating as and for the purpose specified.

CLINTON J. PAINE.

Witnesses:
   J. F. SINGLE,
   M. S. HARVEY.